United States Patent Office 3,501,482
Patented Mar. 17, 1970

3,501,482
2-(CYCLIC AMINO)-2H-INDAZOLES
Ernest F. Le Von, Evanston, Ill., assignor to G. D. Searle & Co., Chicago, Ill., a corporation of Delaware
No Drawing. Filed Feb. 9, 1968, Ser. No. 704,245
Int. Cl. C07d 49/20, 57/00, 99/04
U.S. Cl. 260—293                                          4 Claims

ABSTRACT OF THE DISCLOSURE 2H-indazoles having piperidino, hexamethylenimino, and morpholino groups as substituents at the 2-position are described herein. They possess anti-bacterial, anti-protozoal, anthelmintic, anti-fungal, and anti-algal activity. The compounds are prepared by the thermal decomposition of the appropriate N-(2-azidobenzylideneamino) amines.

Summary of the invention

The present invention relates to a group of amine derivatives of 2H-indazole. More particularly, it relates to a group of compounds having the following general formula

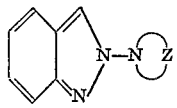

wherein

is selected from the group consisting of piperidino, hexamethylenimino, morpholino, and 2-phenyl-3-methylmorpholino.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl bromide and iodide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are conveniently prepared by the thermal decomposition of a hydrazone of the formula

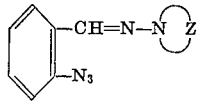

wherein

is defined as above. The decomposition can be carried out on the compound alone although it is preferable to carry out the decomposition using a solution of the compound in an inert solvent such as dimethylformamide at reflux.

The intermediate hydrazones referred to above can be prepared by the reaction of 2-azidobenzaldehyde with the appropriate N-aminoamine. This reaction is usually carried out in an inert solvent in the presence of a catalytic amount of acetic acid. Instead of using the pure N-aminoamine (hydrazine) in the above reaction, it is also possible to use the hydrazine solution obtained from the reduction of the appropriate N-nitrosoamine without purifying the product.

The compounds of the present invention are useful because of their anti-biotic activity against a variety of organisms. Thus, they inhibit the growth of bacteria such as *Diplococcus pneumoniae*, protozoa such as *Tetrahymena gelleii* and *Trichomonas vaginalis*, helminths such as *Turbatrix aceti*, fungi such as *Candida albicans*, and algae such as *Chlorella vulgaris*. The present compounds can thus be combined with various known excipients and adjuvants in the form of dusts, solutions, suspensions, ointments, and sprays to provide compositions useful for disinfecting purposes. The present compounds also inhibit germination of seeds of Trifolium and compositions useful for this purpose can be prepared as described above.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1A

A solution of 1 part of 2-aminobenzaldehyde oxime in 12 parts of concentrated hydrochloric acid is cooled in an ice bath and a solution of 0.5 part of sodium nitrite in 2.5 parts of water is added portionwise while the temperature is maintained at about −6 to −2° C. Almost complete solution results and a cold solution of 23 ml. of 9.1 N potassium hydroxide is added slowly with cooling at 0° C. The mixture is allowed to stand at 0° C. and then warmed to about 15° C. The mixture is then diluted with water and steam distilled. The distillate is collected in an ice cooled receiver and the solid which forms is separated by filtration and dried. The solid obtained in this way is 2-azidobenzaldehyde and it melts at about 35° C.

In a variation of the above procedure, the steam distillation is carried out as above. The distillation is stopped to add toluene to the pot residue and steam distillation is resumed. The organic layer is then separated from the distillate and this solution of 2-azidobenzaldehyde is used in subsequent reactions without further purification.

EXAMPLE 1B

To 119 parts of ice cold concentrated hydrochloric acid there is added 15 parts of 2-aminobenzaldehyde oxime. An additional 60 parts of concentrated hydrochloric acid is then added and a solution of 7.7 parts of sodium nitrite in 30 parts of water is added portionwise while the temperature is maintained at −12 to −5° C. The mixture is then maintained at about 0° C. while it is made alkaline by the slow addition of 200 parts of ice cold 25% aqueous sodium hydroxide. The resultant slurry is diluted with 100 parts of water and 100 parts of toluene and then warmed slowly to 10° C. during 45 minutes. The mixture is then stirred vigorously and heated rapidly to reflux. It is kept at reflux for a few minutes before it is cooled, mixed with charcoal, and filtered. The toluene layer is then separated, washed with water, dried over sodium sulfate, and again treated with charcoal. The resulting solution of 2-azidobenzaldehyde is then stored at 0° C. until needed. It can be used without further purification.

EXAMPLE 2

67.5 parts by volume of a toluene solution containing 6.6 parts of 2-azidobenzaldehyde is added to 5.0 parts of 1-aminopiperidine. A catalytic amount of acetic acid is added and the solvent is then evaporated under reduced pressure to leave a residual oil. This is crystallized from a mixture of methanol and water to give 1-(2-azidobenzylideneamino)piperidine melting at about 46–48° C.

5.7 parts of the hydrazone obtained in the preceding paragraph is dissolved in 275 parts of dimethylformamide and refluxed for 30 minutes under nitrogen. The mixture is then cooled and the solvent is evaporated to leave a residual solid which is recrystallized from hexane. The product obtained in this way is 2-piperidino-2H-indazole melting at about 90–92° C. This compound has the following formula

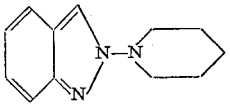

EXAMPLE 3

The toluene solution obtained from the diazotization of 6.0 parts of 2-aminobenzaldehyde oxime according to the procedure described in Example 1B is mixed with 8 ml. of 1-aminohexamethylenimine and 1 drop of acetic acid. The solution is refluxed in an apparatus equipped to separate water from the reaction mixture as it is formed. After 45 minutes, the mixture is colled, washed with dilute potassium carbonate solution and with water. It is then dried and the solvent is evaporated to leave a yellow oil which is crystallized from ethanol to give 1-(2-azidobenzylideneamino)hexamethylenimine melting at about 55–57° C.

A solution of 5.7 parts of 1-(2-azidobenzylideneamino)hexamethylenimine in 275 parts of dimethylformamide is refluxed for about 45 minutes under nitrogen. The solvent is then evaporated under reduced pressure to leave a residual yellow syrup. This is dissolved in benzene and chromatographed on a silica gel column and eluted with hexane containing increasing percentages of benzene. The fraction eluted with 40% benzene in hexane is collected and the solvent is evaporated from this eluate to give a yellow oil which is dried under vacuum to give 2-hexamethylenimino-2H-indazole.

The addition of 5 mg. of this compound to agar plates individually inoculated with Candida albicans, Chlorella vulgaris, and Diplococcus pneumoniae inhibited the growth of each of these organisms.

EXAMPLE 4

A solution of 2.8 parts of 2-hexamethylenimino-2H-indazole in 10 parts of ether and 5 parts of methanol is warmed with an excess of methyl iodide. The mixture is then further diluted with 10 parts of ether. The oily precipitate which forms is separated and the solvent is evaporated from the ether solution. The residue from the ether solution is dissolved in methanol and heated with an excess of methyl iodide for 3 days. The precipitate which forms is separated by filtration and crystallized from a mixture of ethanol and ether. The resultant crystallized material is warmed in 10 parts of ethanol and filtered through diatomaceous earth to remove insoluble material. The addition of ether to the resulting solution gives 2-hexamethylenimino-2H-indazole methiodide melting at about 153–155° C.

EXAMPLE 5

6.0 parts of 1-aminomorpholine is mixed with a toluene solution containing 8.5 parts of 2-azidobenzaldehyde and this is diluted to about 300 parts by volume and a catalytic amount of acetic acid is added. The mixture is then refluxed so that the water formed is separated from the mixture. The mixture is then cooled, washed with cold potassium carbonate solution and then with water, and finally dried by filtration through potassium carbonate. The solvent is evaporated under reduced pressure to give a brown syrup which is recrystallized from hexane to give crude 4-(2-azidobenzylideneamino)morpholine melting at about 85–90° C.

A solution of 3.9 parts of 4-(2-azidobenzylideneamino)morpholine in 275 parts of dimethylformamide is refluxed under nitrogen for 30 minutes. The solvent is then evaporated under reduced pressure and the residue is dissolved in 2-propanol and treated with charcoal. Concentration of the 2-propanol solution gives a white crystalline product which is further recrystallized from 2-propanol to give 2-morpholino-2H-indazole melting at about 132–133° C.

EXAMPLE 6

A solution of 10 parts of 2-phenyl-3-methyl-4-nitrosomorpholine in 45 parts of tetrahydrofuran is added portionwise to a suspension of 3.5 parts of lithium aluminum hydride in 90 parts of tetrahydrofuran under nitrogen with cooling in a water bath. The mixture is then stirred at room temperature for about 2 hours and methanol is added cautiously to decompose any excess lithium aluminum hydride. The mixture is then hydrolyzed by the addition of 3.5 parts of water followed by 3.5 parts of 6 N sodium hydroxide and then 10.5 parts of water. The mixture is filtered and washed with hot tetrahydrofuran. The resulting solution is mixed with a solution of 7.0 parts of 2-azidobenzaldehyde in 95 parts of toluene. A catalytic amount of acetic acid is added and the solvent is then evaporated under reduced pressure to leave a syrup. Crystallization of this material from 2-propanol gives a pale yellow solid melting at about 114–116° C. This is 4-(2-azidobenzylideneamino)-2-phenyl-3-methylmorpholine.

A solution of 9.6 parts of 4-(2-azidobenzylideneamino)-2-phenyl-3-methylmorpholine in 475 parts of dry dimethylformamide is refluxed for 50 minutes under nitrogen. The mixture is then cooled and the solvent is evaporated under reduced pressure to leave a residual yellow syrup which solidifies on cooling. This is recrystallized from 2-propanol to give 2-(2-phenyl-3-methylmorpholino)-2H-indazole melting at about 147–149° C.

What is claimed is:
1. A compound of the formula

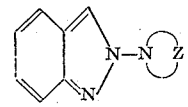

wherein

is selected from the group consisting of piperidino, hexamethylenimino, morpholino, and 2-phenyl-3-methylmorpholino.

2. A compound according to claim 1 which is 2-piperidino-2H-indazole.

3. A compound according to claim 1 which is 2-hexamethylenimino-2H-indazole.

4. A compound according to claim 1 which is 2-hexamethylenimino-2H-indazole methiodide.

References Cited

UNITED STATES PATENTS 3,133,081    5/1964    Lafferty _____ 260—310

HENRY R. JILES, Primary Examiner

G. T. TODD, Assistant Examiner

U.S. Cl. X.R.

260—247.5, 310, 999